(12) United States Patent
Kushida et al.

(10) Patent No.: US 11,224,976 B2
(45) Date of Patent: Jan. 18, 2022

(54) APPARATUS FOR LOADING/UNLOADING WORKPIECES INTO/FROM FURNACE

(71) Applicant: TOYODA IRON WORKS CO., LTD., Toyota (JP)

(72) Inventors: Kenji Kushida, Toyota (JP); Nobuyuki Kawahara, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 571 days.

(21) Appl. No.: 15/768,641

(22) PCT Filed: Oct. 14, 2016

(86) PCT No.: PCT/JP2016/080480
§ 371 (c)(1),
(2) Date: Apr. 16, 2018

(87) PCT Pub. No.: WO2017/065254
PCT Pub. Date: Apr. 20, 2017

(65) Prior Publication Data
US 2018/0304476 A1    Oct. 25, 2018

(51) Int. Cl.
*B25J 15/08*    (2006.01)
*F27D 3/00*    (2006.01)
(Continued)

(52) U.S. Cl.
CPC ............ *B25J 15/08* (2013.01); *B25J 9/0009* (2013.01); *B25J 9/0012* (2013.01); *B25J 11/00* (2013.01);
(Continued)

(58) Field of Classification Search
None
See application file for complete search history.

(56) References Cited

U.S. PATENT DOCUMENTS 5,445,486 A * 8/1995 Kitayama ......... H01L 21/68707
414/416.03
5,489,192 A    2/1996 Taniguchi
(Continued)

FOREIGN PATENT DOCUMENTS

JP    H6-204316 A    7/1994
JP    2001-79790 A    3/2001
(Continued)

OTHER PUBLICATIONS

Coating_definition from thefreedictionary.com printed out on Jan. 28, 2021. (Year: 2021).*
(Continued)

*Primary Examiner* — Michael S Lowe
(74) *Attorney, Agent, or Firm* — Oliff PLC

(57) ABSTRACT

An apparatus for loading/unloading workpieces, including a furnace heating a workpiece, and a robot loading and/or unloading a workpiece into/from the furnace. The robot may include a manipulator linkage and a fork at an end of the manipulator linkage. The fork may have an upper side on which a workpiece is placed while being loaded into and/or unloaded from the furnace. The fork may include a parallel arrangement of fork elements, each fork element in the fork having a length and rectangular cross section perpendicular to the length. Each fork element may have a workpiece carrying surface on which a workpiece is placed and an opposite surface to the workpiece carrying surface. The fork element may include a heat insulator disposed on the workpiece carrying surface at least over an area where a workpiece is placed to equalize longitudinal thermal expansions in the workpiece carrying surface and the opposite surface.

2 Claims, 4 Drawing Sheets

(51) Int. Cl.
  *B25J 15/00* (2006.01)
  *F27B 5/12* (2006.01)
  *B25J 19/00* (2006.01)
  *C21D 9/00* (2006.01)
  *F27B 5/13* (2006.01)
  *B25J 11/00* (2006.01)
  *B25J 9/00* (2006.01)
  *C21D 1/673* (2006.01)

(52) U.S. Cl.
  CPC ....... *B25J 15/0014* (2013.01); *B25J 19/0075* (2013.01); *C21D 9/0018* (2013.01); *C21D 9/0025* (2013.01); *F27B 5/12* (2013.01); *F27B 5/13* (2013.01); *F27D 3/00* (2013.01); *F27D 3/0024* (2013.01); *F27D 3/0025* (2013.01); *C21D 1/673* (2013.01); *F27D 2003/0034* (2013.01); *F27D 2003/0046* (2013.01)

(56) References Cited

U.S. PATENT DOCUMENTS

| | | | | |
|---|---|---|---|---|
| 8,366,375 | B2* | 2/2013 | Musha | F16J 15/40 414/744.5 |
| 8,529,136 | B2* | 9/2013 | Liu | F16C 19/20 384/492 |
| 8,672,604 | B2* | 3/2014 | Kubota | B25J 18/04 414/744.3 |
| 9,302,395 | B2* | 4/2016 | Ando | B25J 9/042 |
| 2010/0068025 | A1 | 3/2010 | Miyamoto et al. | |

FOREIGN PATENT DOCUMENTS

| | | |
|---|---|---|
| JP | 2007-266221 A | 10/2007 |
| JP | 2008-305989 A | 12/2008 |
| JP | 2011-187910 A | 9/2011 |
| JP | 2014-077567 A | 5/2014 |
| WO | 2008/120294 A1 | 10/2008 |

OTHER PUBLICATIONS

Nov. 8, 2016 International Search Report issued in International Patent Application No. PCT/JP2016/080480.

Feb. 12, 2019 European Search Report issued in Patent Application No. 16855507.6.

Dec. 27, 2018 Office Action issued in Japanese Patent Application No. 2015-203652.

* cited by examiner

APPARATUS FOR LOADING/UNLOADING WORKPIECES INTO/FROM FURNACE

FIELD OF THE DISCLOSURE

The present disclosure relates to an apparatus for loading and unloading workpieces into and from a furnace, and particularly to a fork that is provided at an end of an manipulator linkage of a robot and that loads and unloads a workpiece into and from a furnace.

DESCRIPTION OF THE RELATED ART

Component parts of an automobile body, such as pillar parts, are in general made of steel sheets and formed by press forming. Since the press forming is performed hot, the blank materials for forming the parts (hereinafter referred to as workpieces) are heated in a furnace prior to the press forming. The workpiece is loaded into and unloaded from the furnace by robotic manipulation. More specifically, the workpiece is loaded into and unloaded from the furnace by a robot while placed on the upper surface of a fork (also called tines) attached to the end of the manipulator linkage of the robot. The fork comprises a parallel arrangement of fork elements, each having a length. The fork element is typically tubular and has a rectangular cross section perpendicular to the length.

The furnace is typically a multi-stage furnace for production efficiency. Workpieces are loaded into and unloaded from the furnace with a fork controlled by the robot. The furnace is maintained at a high temperature (about 900° C.) to heat workpieces to a predetermined temperature. When heated to the predetermined temperature in the furnace, the workpiece is then sent to the press forming process in the next step to be press formed into the product shape.

SUMMARY OF THE INVENTION

According to the descriptions above, when a workpieces is loaded into and out of the furnace, the fork is also exposed to the high temperature in the furnace and heated. In particular, when the workpiece heated in the furnace is unloaded by the fork, the upper surface of the fork, on which the workpiece is placed, is also influenced by the high temperature of the heated workpiece. The high temperature influence of the workpiece on the fork at the time of unloading continues until the workpiece is delivered to the press forming process in the next step. More specifically, since the fork comprises a parallel arrangement of fork elements, each fork element is affected by the high temperature inside the furnace and by the workpieces, and as a result the entire fork is affected.

Therefore, in a fork element, the upper surface (or workpiece carrying surface), on which the workpiece is placed, is more susceptible to the high temperature than the opposite, lower surface, resulting in a temperature difference between the upper and lower surfaces. If the entire fork element is made of a single material, the thermal expansion differs between the upper and lower surfaces; the hotter upper surface thermally expands more than the lower surface. Then, the fork element droops downward over the length. This phenomenon occurs in all the fork elements in the fork. As a result, the entire fork droops downward. This means that the distal end of the fork droops out of the preset position.

The elevation of the fork when inserted to each stage in the furnace is typically set on the basis of the normal shape of the fork. When the fork droops due to thermal deformation as described above, the fork may contact the inlet or outlet of the furnace and damage the furnace and fork when entering the furnace to load or unload a workpiece.

In order to solve the problem above, Japanese Patent Application Publication No. 2014-77567 proposes a method including flowing cooling water into the workpiece transfer bars. However, this method requires to externally supply the cooling water into the workpiece transfer bars (i.e. fork elements) and handle it. This has a disadvantage that the configuration becomes inevitably complicated, so it is desirable to solve the problem by the structure of the fork elements themselves without external cooperation.

There is thus a need to prevent or reduce drooping of the fork by substantially equalizing thermal expansion between the workpiece carrying surface and the opposite side by the structure of the fork elements themselves.

The present invention in one aspect provides an apparatus for loading/unloading workpieces into/from a furnace, comprising a furnace heating a workpiece, and a robot loading and/or unloading a workpiece into/from the furnace, the robot comprising a manipulator linkage and a fork at an end of the manipulator linkage, the fork having an upper side on which a workpiece is placed while being loaded into and/or unloaded from the furnace, and the fork comprising a parallel arrangement of fork elements, each fork element in the fork having a length. Each fork element has a rectangular cross section perpendicular to the length, and has a workpiece carrying surface on which a workpiece is placed and an opposite surface to the workpiece carrying surface, the fork element including, in its structure itself, a means for equalizing longitudinal thermal expansions in the workpiece carrying surface and in the opposite surface. This arrangement allows the workpiece to be loaded into and/or unloaded from the furnace while placed on the upper surface of the fork.

In some embodiments, this arrangement equalizes the thermal expansions of the workpiece carrying surface of the fork element and of the opposite surface when the fork element is affected by the heating in the furnace or when the workpiece carrying surface is thermally affected by the heated workpiece. This prevents or reduces downward drooping of the fork element having a length. As a result, drooping of the entire fork comprising the fork elements is prevented or reduced so that the fork will not be damaged by contacting the furnace when entering the furnace.

In some embodiments, the arrangement above also simplifies the structure itself as compared with the use of external resource such as cooling water as compared with conventional structures (for example, see Japanese Patent Application Publication No. 2014-077567 mentioned above).

In one embodiment, the means for equalizing thermal expansions may preferably comprise a heat insulator disposed on the workpiece carrying surface of each fork element at least over an area where a workpiece is placed. In this embodiment, the means of equalizing thermal expansions is realized as the heat insulator disposed on the workpiece carrying surface. The heat insulator reduces the workpiece carrying surface from being affected by the heating ambient temperature in the furnace and the high temperature of the heated workpieces, and in some embodiments substantially equalizes the temperatures of the workpiece carrying surface and of the opposite surface. This also equalizes the thermal expansion between the workpiece carrying surface and the opposite surface, and thereby prevents or reduces the drooping of the fork element and hence the entire fork.

In another embodiment, the heat insulator on the workpiece carrying surface may preferably comprise a ceramic heat insulating coating. By the use of a ceramic heat insulating coating as the heat insulator, one can easily realize the means of equalizing thermal expansions by coating the ceramic heat insulating coating on the workpiece carrying surface. In some embodiments, it is possible to accurately equalize thermal expansions of the workpiece carrying surface and of the opposite surface.

In another embodiment, the means for equalizing thermal expansions may preferably comprise two separate members forming each fork element, one including the workpiece carrying surface and the other the opposite surface, the separate members having different thermal expansion coefficients. In this embodiment, the means of equalizing thermal expansions is realized by differentiating thermal expansion coefficients of the separate members. This differentiates the thermal expansion coefficients of the member including the workpiece carrying surface and of the member including the opposite surface. It is therefore possible to substantially equalize longitudinal thermal expansion when the surfaces are heated to different temperatures by selecting materials with the thermal expansion coefficient. This substantially equalizes the thermal expansion between the workpiece carrying surface and the opposite surface, and thereby prevents or reduces the drooping of the fork element and hence the entire fork.

In still another embodiment, the separate member including the opposite surface may preferably have a larger thermal expansion coefficient than that of the separate member including the workpiece carrying surface. Typically, the fork element have a higher temperature on the workpiece carrying surface, on which heated workpieces are placed, than on the opposite surface. Increasing the thermal expansion coefficient of the member on the opposite surface which has a lower temperature effectively equalizes the thermal expansion coefficients of the surfaces.

In another embodiment, each fork element may preferably be hollow tubular. Hollow tubular shapes are used for general purpose, and thus easy to manufacture, easy to obtain or procure, and inexpensive.

In some embodiments, the configuration described above substantially equalizes thermal expansion between the workpiece carrying surface and the opposite surface by the structure of the fork elements themselves, thereby preventing or reducing drooping of the fork.

DETAILED DESCRIPTION OF THE INVENTION

Figure 1:
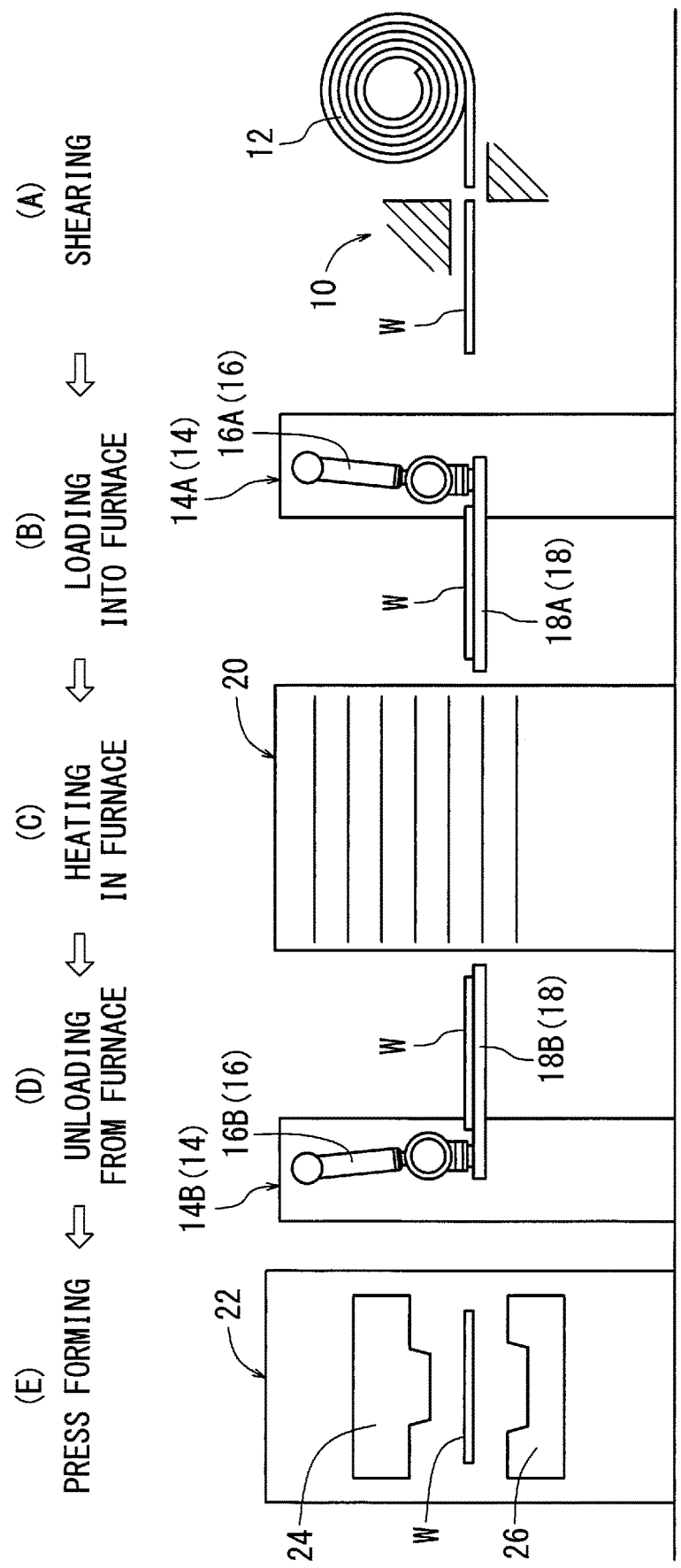
FIG. 1 is a process chart of a workpiece according to an embodiment.

Various embodiments of the present invention will be described below with reference to the drawings. FIG. 1 shows a processing of workpieces in an embodiment. The workpiece processing includes a step (A) of shearing a workpiece, a step (B) of loading the workpiece into the furnace, a step (C) of heating the workpiece in the furnace, a step (D) of unloading the workpiece from the furnace, and a step (E) of press forming. The tools for the processes are shown in a pictorial representation, and not in the actual scale or with the actual dimensional relationship. The workpiece can be a part of an automobile body, such as a pillar part. In the first step (A) of shearing, a sheet material of a predetermined size as the workpiece W for a pillar part is cut off from a roll 12 by a shearing machine 10. The cut workpiece W is loaded into the furnace 20 in the loading step (B) to the furnace. In one embodiment, the furnace 20 may be a multi-stage furnace. A workpiece W may be loaded onto each of the multiple stages. The number of stages for the furnace 20 may be appropriately determined according to the number of products to be produced.

The step (B) of loading into the furnace is performed with a loading robot 14A. A loading fork (also called tines) 18A is disposed at the end of the manipulator linkage 16A for loading of the loading robot 14A. The workpiece W cut off in the shearing step (A) is placed on the loading fork 18A and carried into the furnace 20. The workpiece W thus carried on the loading fork 18A into the furnace is then placed on the shelf on one of the stages in the furnace, and the loading fork 18A is pulled out alone. The operations of the loading fork 18A in loading workpieces W are conducted by the controlled manipulation by the loading robot 14A.

In the step (C) of heating in furnace, the workpiece W placed on each stage in the furnace 20 is heated to a temperature (usually about 900° C.) suitable for the forming process in the subsequent step (E) of press forming. The heated workpiece W is unloaded from the furnace 20 in the unloading step (D).

The step (D) of unloading from furnace is performed with an unloading robot 14B. The unloading robot 14B may have a similar configuration as the loading robot 14A described above. Therefore, in the following descriptions, the loading robot 14A and unloading robot 14B, when described collectively, will be given reference symbols with the suffixes "A" and "B" omitted from the end. The same applies to the symbols for related features. An unloading fork 18B is disposed at the end of the manipulator linkage 16B of the unloading robot 14B. The workpieces W heated in the furnace 20 are unloaded by the unloading fork 18B. More specifically, the unloading fork 18B is inserted into the furnace 20 through the outlet of the furnace 20, picks up the heated workpiece W from the shelf on one of the stages onto the unloading fork 18B, and carries it out of the furnace 20. The operations of the unloading fork 18B in unloading workpieces W are conducted by the controlled manipulation by the unloading robot 14B.

The workpiece W taken out of the furnace 20 in the step (D) of unloading from furnace is sent to the press forming step (E) and is formed by a press machine 22. The press machine 22 usually includes an upper die 24 and a lower die 26 that have forming surfaces for the shape of the final product. The workpieces W are formed into a predetermined product shape between the upper die 24 and lower die 26. In some cases, an optional step of trimming excess material may be performed after pressing the workpiece W to obtain the final shape of the product.

Figure 2:
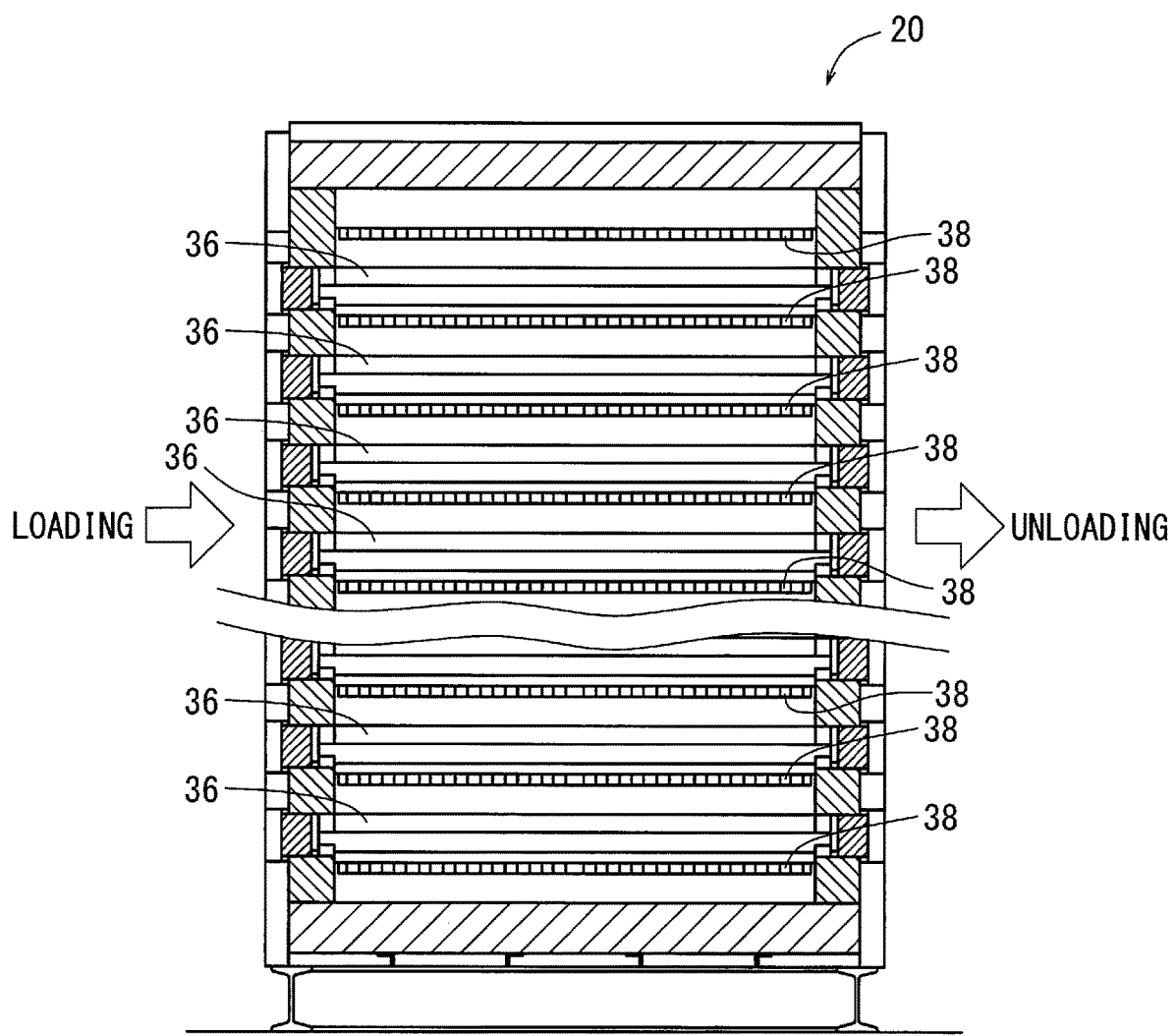
FIG. 2 is a front view of a furnace.

FIG. 2 shows a detailed configuration of the furnace 20 used in the step (C) of heating in furnace in one embodiment. The furnace 20 may be a multi-stage furnace. On each stage, a shelf 36 for placing a workpiece W is installed. Heat sources 38 such as electric or other heaters are installed above and below the shelves 36 so as to create a high temperature atmosphere in the interior of the furnace 20 to heat the workpieces W (not shown in FIG. 2) placed on the shelves 36. In one particular embodiment, the ambient temperature in the furnace may be about 900° C. The shelves 36, on which workpieces W are placed, are spaced apart in parallel so that the fork elements 30 of the fork 18, which will be described later, can be inserted when loading and unloading.

Figure 3:
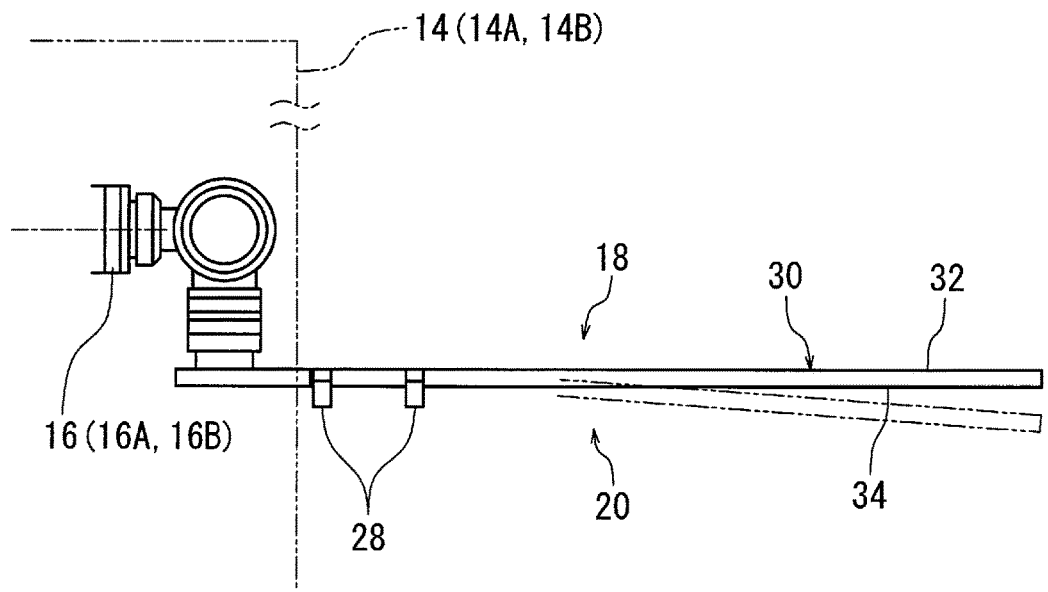
FIG. 3 is a side view of a fork disposed at the end of the manipulator linkage of a robot for loading/unloading workpieces into/from a furnace.
Figure 4:
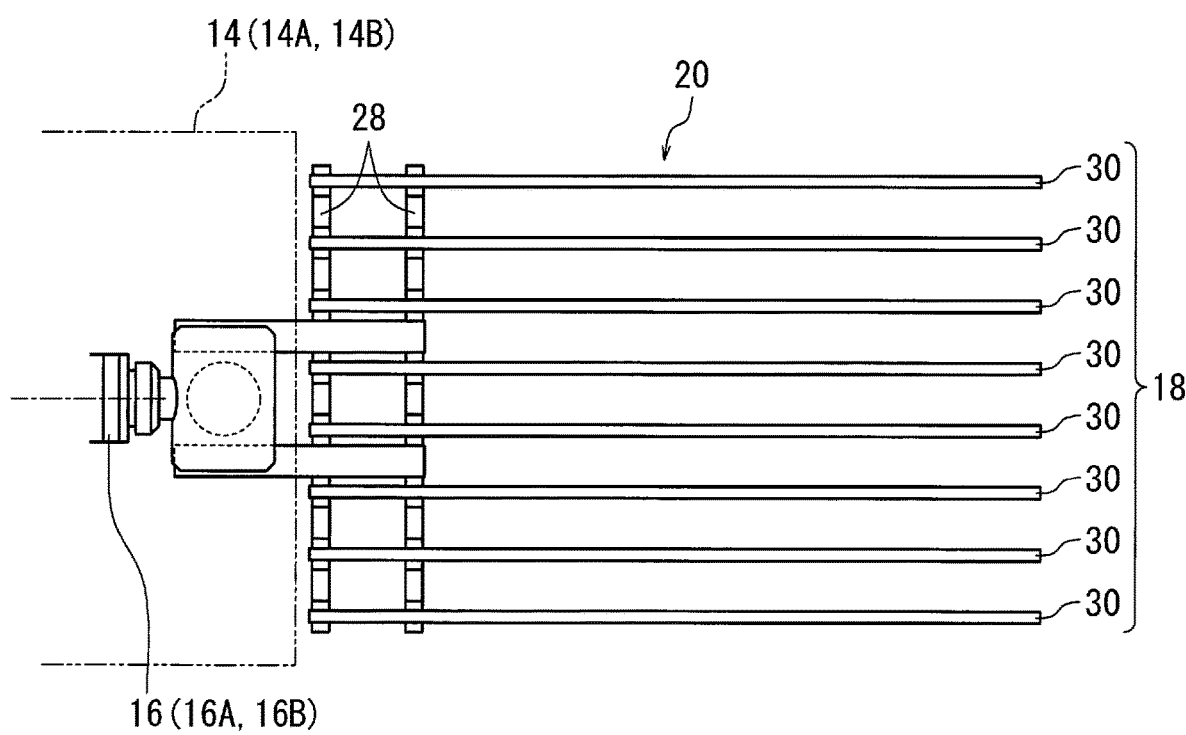
FIG. 4 is a plan view of the fork shown in FIG. 3.

FIGS. 3 and 4 show the configuration of the fork 18 in one embodiment, with FIG. 3 showing in a side view and FIG. 4 in a plan view. As better shown in FIG. 4, the fork 18 comprises a parallel arrangement of fork elements 30. The fork elements 30 are integrally tied, at the left ends as seen in FIGS. 3 and 4, by a connecting element 28. The tied ends are connected to the end of the manipulator linkage 16 of the robot 14. As a result, the fork 18 can be controllably operated by the robot.

Each fork element 30 in the fork 18 has a length and is supported in a cantilevered manner at one end and free at the other end. When thermally affected by the high temperature in the furnace 20, the fork elements 30 can warp downward over the length and droop downward, as shown in the phantom line in FIG. 3. The inventors considered that this occurred for the following reason. Each fork element 30 is typically has a hollow rectangular cross section perpendicular to its length. The workpiece carrying surface 32 on the upper side of the rectangle, on which the workpiece W is placed, is thermally influenced by the ambient temperature in the furnace 20 as well as the heated workpiece W and raised to a higher temperature than the lower surface 34 opposite to the workpiece carrying surface 32. According to the results of a measurement, there was a temperature difference of about 30° C. The upper surface of the workpiece carrying surface 32 might have been thermally expanded more than the lower surface 34, resulting in the warpage.

The inventors of the present invention then found that applying a means of equalizing thermal expansions of the upper and lower surfaces 32 and 34 could prevent warpage when the upper and lower sides of the rectangular shape of the fork element 30 in the fork 18, that is, the workpiece carrying surface 32 and the opposite, lower surface 34 were thermally influenced in different ways. The first measure that has been considered is to equalize thermal expansions by equalizing the temperature of the upper and lower surfaces 32 and 34 of the fork element 30. The second is to equalize thermal expansions of the upper and lower surfaces 32 and 34 when they have different temperatures by using members with different thermal expansion coefficients.

Figure 5:
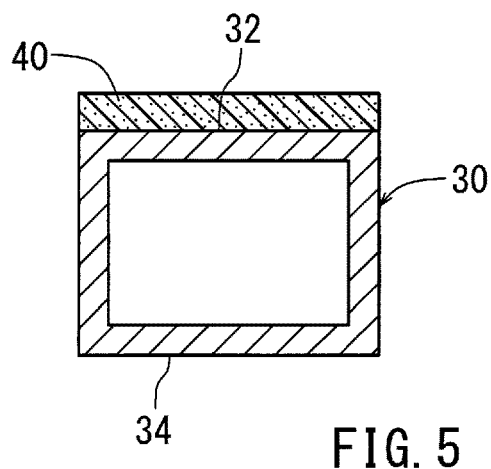
FIG. 5 is a cross-sectional view of a fork element with means of equalizing thermal expansions according to an embodiment.

FIG. 5 shows a means of equalizing thermal expansions in one embodiment. In this embodiment, the fork element 30 has a hollow rectangular cross section perpendicular to the length of the fork element 30, and the ceramic heat insulating coating 40 is applied to the upper, workpiece carrying surface 32. In a particular embodiment, the ceramic heat insulating coating 40 can comprise a heat insulating coating material developed by NASA. When the workpiece W is placed on the upper, workpiece carrying surface 32, the upper surface, thermally insulated from the workpiece W by the ceramic heat insulating coating 40, remains at substantially the same temperature as the lower surface 34 so that the thermal expansion is equalized with the lower surface 34. This prevents or reduces the drooping of the fork 18 so that the fork 18 will not contact and damage the furnace 20 and fork 18 when entering the furnace 20. The heat insulator applied to the workpiece carrying surface 32 is not limited to the ceramic heat insulating coating, and can be any suitable heat insulator that can block or reduce transmission of heat from the workpiece.

In another embodiment, the ceramic heat insulating coating 40 may be applied only to an area of the workpiece carrying surface 32 within which the workpiece W is to be placed, instead of being applied over the entire upper, workpiece carrying surface 32 as described above. Further, in another embodiment, the fork element 30 may be solid instead of being hollow tubular. However, a solid one is preferable for controlling the influence of temperature.

Figure 6:
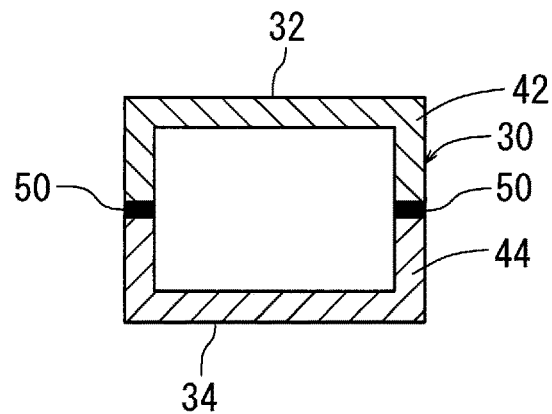
FIG. 6 is a cross-sectional view of a fork element with means of equalizing thermal expansions according to another embodiment.

FIG. 6 shows a means of equalizing thermal expansions in another embodiment. In this embodiment, the fork element 30 may have a hollow rectangular cross section as with the embodiment described above. However, the fork element 30 comprises an upper member 42 forming the upper, workpiece carrying surface 32 and a lower member 44 forming the lower surface 34 as divided separate members, the members 42 and 44 being integrally joined together by welding 50. The upper member 42 and lower member 44 have different thermal expansion coefficients. In this embodiment, the lower member 44 has a larger thermal expansion coefficient than the upper member 42. For example, the upper member 42 may be made of SUS310S and the lower member 44 of AH-4 (a product of Nippon Steel & Sumitomo Metal Corp.).

Figure 7:
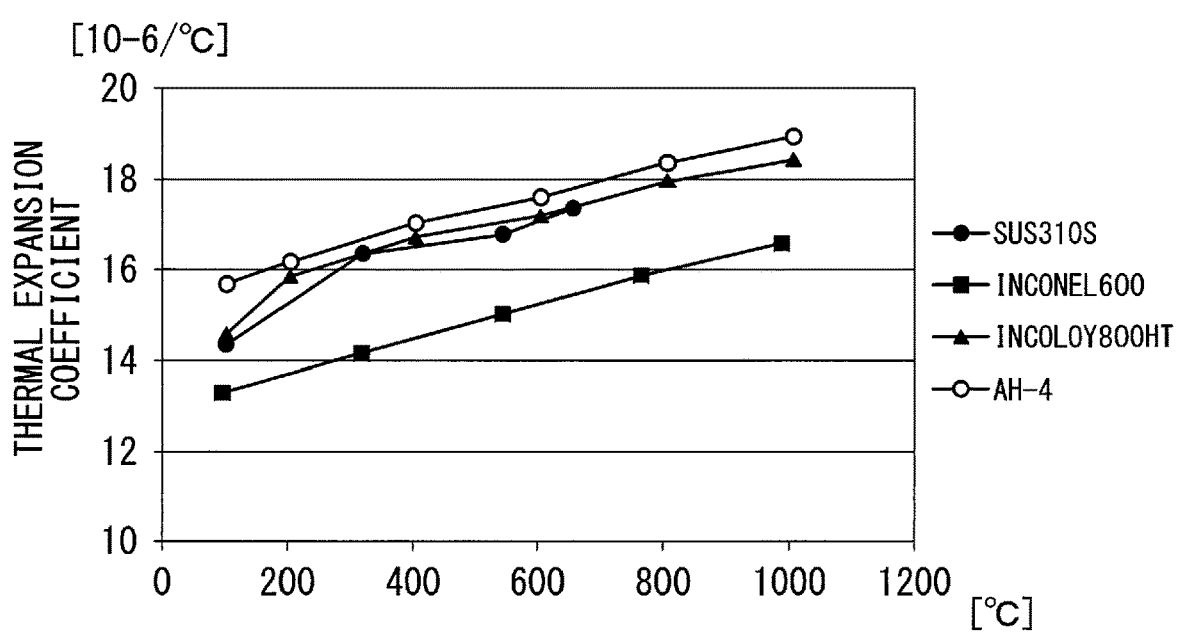
FIG. 7 is a graphic chart showing a thermal expansion coefficient of a high-temperature physical property of a material that is supposed to be applied as upper and lower members.

FIG. 7 is a graphic chart showing high temperature properties of materials which is expected to be applied as the above-mentioned dividing members, and shows the change of their thermal expansion coefficients with temperature. Four different materials are shown for comparison: SUS310S, Inconel 600 (registered trademark), Incoloy 800HT (registered trademark), and AH-4. A combination of materials for the upper member 42 and lower member 44 shown in FIG. 6 may be suitably selected based on the shown high temperature properties. The sources of the data used in FIG. 7 are as follows: the data for SUS310S is based on materials provided by Japan Stainless Steel Association and Nippon Steel & Sumitomo Metal Corp; the data for Inconel 600 (registered trademark) and Incoloy 800HT (registered trademark) are based on materials provided by Nihon Yakin Kogyo, Co., Ltd; and the data for AH-4 is based on materials provided by Nippon Steel & Sumitomo Metal Corp.

In the means of equalizing thermal expansions in the embodiment described above with reference to FIG. 6 equalizes longitudinal thermal expansions in the upper member 42 and in the lower member 44 because the upper member 42 has a smaller thermal expansion coefficient than the lower member 44, when the upper, workpiece carrying surface 32 has a higher temperature than the lower surface 34. This prevents or reduces drooping of the fork 18 so that the fork 18 will not contact and damage the furnace 20 when entering the furnace 20.

The means of equalizing thermal expansions in the embodiments described above with reference to FIGS. 5 and

6 require no external cooperation, such as external supply of cooling water as required in the prior art, resulting in a simple configuration.

While specific embodiments of the present invention have been described above, the embodiments of the present invention are not limited to such embodiments, and those skilled in the art can make various changes, additions and deletions without departing from the scope of the present invention.

The invention claimed is:

1. An apparatus for loading/unloading workpieces, comprising:
    a furnace configured to heat a workpiece; and
    a robot configured to load and/or unload the workpiece into/from the furnace,
    the robot comprising a manipulator linkage and a fork at an end of the manipulator linkage,
    the fork having an upper side on which the workpiece is placed while being loaded into and/or unloaded from the furnace, and the fork comprising a parallel arrangement of fork elements, each fork element in the fork being hollow tubular and having a length and a hollow rectangular cross section perpendicular to the length, and
    each fork element having a workpiece carrying surface on which the workpiece is placed and an opposite surface to the workpiece carrying surface, each fork element including a heat insulator disposed on a respective workpiece carrying surface at least over an area where the workpiece is placed to equalize longitudinal thermal expansions in the workpiece carrying surface and in the opposite surface, the heat insulator on the workpiece carrying surface comprising a ceramic heat insulating coating, and no heat insulator is disposed on the opposite surface and outermost lateral surfaces of each fork element, wherein
    the hollow rectangular cross section of each fork element is defined by the workpiece carrying surface, the opposite surface, and the outermost lateral surfaces of each fork element.

2. The apparatus of claim 1, wherein the furnace is configured to heat the workpiece to a temperature of about 900° C.

* * * * *